United States Patent
Komatsu

(10) Patent No.: US 9,413,952 B2
(45) Date of Patent: Aug. 9, 2016

(54) IMAGE PROCESSING APPARATUS, DISTANCE MEASURING APPARATUS, IMAGING APPARATUS, AND IMAGE PROCESSING METHOD

(71) Applicant: CANON KABUSHIKI KAISHA, Tokyo (JP)

(72) Inventor: Satoru Komatsu, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 6 days.

(21) Appl. No.: 14/453,888

(22) Filed: Aug. 7, 2014

(65) Prior Publication Data
US 2015/0042840 A1    Feb. 12, 2015

(30) Foreign Application Priority Data
Aug. 12, 2013 (JP) .................... 2013-167531

(51) Int. Cl.
*H04N 5/235* (2006.01)
*H04N 5/232* (2006.01)
*G06T 3/00* (2006.01)

(52) U.S. Cl.
CPC .......... *H04N 5/23229* (2013.01); *G06T 3/0081* (2013.01); *H04N 5/23219* (2013.01); *H04N 5/23212* (2013.01)

(58) Field of Classification Search
CPC .......... H04N 5/23212; H04N 5/23229; H04N 5/2226; G06T 3/0081
See application file for complete search history.

(56) References Cited

U.S. PATENT DOCUMENTS

| | | | | |
|---|---|---|---|---|
| 5,768,439 A * | 6/1998 | Suzuka | ................... | G06T 17/00 348/699 |
| 7,634,143 B2 * | 12/2009 | Saito | ........................ | G06T 5/50 348/155 |
| 7,680,342 B2 * | 3/2010 | Steinberg | ............. | G06K 9/0061 382/224 |
| 8,199,222 B2 * | 6/2012 | Drimbarean | ............ | G06T 5/009 348/239 |
| 8,218,061 B2 * | 7/2012 | Baxansky | .......... | H04N 5/23212 348/345 |
| 2007/0296833 A1 * | 12/2007 | Corcoran | ........... | H04N 5/23248 348/231.99 |
| 2008/0069433 A1 * | 3/2008 | Corcoran | ................. | G06K 9/40 382/149 |
| 2011/0102553 A1 * | 5/2011 | Corcoran | ........... | G06K 9/00281 348/50 |
| 2011/0181770 A1 * | 7/2011 | Rapaport | ............. | H04N 5/2356 348/348 |
| 2013/0300860 A1 | 11/2013 | Komatsu | | |
| 2013/0307966 A1 | 11/2013 | Komatsu | | |

FOREIGN PATENT DOCUMENTS

| | | |
|---|---|---|
| JP | H07-311841 A | 11/1995 |
| JP | 2008-310418 A | 12/2008 |
| JP | 4340968 B2 | 10/2009 |

OTHER PUBLICATIONS

U.S. Appl. No. 14/340,824, filed Jul. 25, 2014, Takahiro Takahashi, et al.
U.S. Appl. No. 14/444,119, filed Jul. 28, 2014, Takahiro Takahashi, et al.
U.S. Appl. No. 14/528,250, filed Oct. 30, 2014, Satoru Komatsu.

* cited by examiner

*Primary Examiner* — Aung S Moe
*Assistant Examiner* — John H Morehead, III
(74) *Attorney, Agent, or Firm* — Fitzpatrick, Cella, Harper & Scinto

(57) ABSTRACT

An image processing apparatus comprises a corresponding point determining unit configured to, for a plurality of points contained in a first image, search a second image for corresponding points; a transformation coefficient calculating unit configured to divide the plurality of corresponding points into groups, based on amounts of misalignment between the images at the corresponding points, and configured to calculates a coordinate transformation coefficient for each of the groups; and an image synthesizing unit configured to generate a synthesis image, using a plurality of the coordinate transformation coefficients and the second image.

20 Claims, 15 Drawing Sheets

SECOND IMAGE

IMAGE PROCESSING APPARATUS, DISTANCE MEASURING APPARATUS, IMAGING APPARATUS, AND IMAGE PROCESSING METHOD

BACKGROUND OF THE INVENTION

1. Field of the Invention

The present invention relates to an image processing apparatus, and in particular to a technique for aligning a plurality of images with one another.

2. Description of the Related Art

Various methods have been proposed to measure a distance to a subject (subject distance) based on an image acquired by an imaging apparatus, and the depth from defocus (DFD) method is one such method. The DFD method is a method of acquiring a plurality of images having different degrees of a blur by changing the parameters of an imaging optical system, and estimating a subject distance based on the quantity of blur included in the plurality of images. The DFD method allows calculating the distance using only one imaging system, therefore the DFD method can easily be incorporated into the apparatus.

The DFD method needs accurate alignment of a plurality of images taken. Thus, techniques for aligning images with one another have been proposed.

For example, Japanese Patent No. 4340968 discloses an image processing apparatus calculating motion vectors between images, extracting motions of subjects other than moving subjects to estimate affine transformation coefficients, and transforming images based on the affine transformation coefficients to align the images with each other. Furthermore, Japanese Patent Application Laid-open No. 2008-310418 discloses an image processing apparatus that performs alignment by, in addition to aligning non-moving subjects using an affine transformation, calculating the amounts of local misalignment for blocks for motion vectors excluded as moving subjects.

SUMMARY OF THE INVENTION

The image processing apparatus described in Japanese Patent No. 4340968 aligns the images with each other with the moving subjects present in the images excluded. This allows accurate correction of misalignment caused by movement of an imaging apparatus itself. However, alignment is not performed on the moving subjects in the taken images, resulting in synthesis of the images with the misaligned moving subjects.

Furthermore, image processing apparatus described in Japanese Patent Application Laid-open No. 2008-310418 performs alignment on blocks determined to contain motion vectors representing moving subjects by calculating the amounts of local misalignment. This technique individually corrects the motion vectors in the same moving subject, thus correction of this moving subject for each block thereof may be implemented in different directions due to noise or the like, even when the blocks relate to the same moving subject. Additionally, only parallel movement is supported for the alignment of moving subjects, precluding correction of deformation other than the parallel movement.

With the above-described problems in view, it is an object of the present invention to provide a technique used for an image processing apparatus aligning a plurality of images with one another, to perform accurate alignment all over the images.

The present invention in its one aspect provides an image processing apparatus comprises a corresponding point determining unit configured to, for a plurality of points contained in a first image, search a second image for corresponding points; a transformation coefficient calculating unit configured to divide the plurality of corresponding points into groups, based on amounts of misalignment between the images at the corresponding points, and configured to calculate a coordinate transformation coefficient for each of the groups; and an image synthesizing unit configured to generate a synthesis image, using a plurality of the coordinate transformation coefficients and the second image.

The present invention in its another aspect provides an image processing method comprises a corresponding point determining step of, for a plurality of points contained in a first image, searching a second image for corresponding points; a transformation coefficient calculating step of dividing the plurality of corresponding points into groups based on amounts of misalignment between the images at the corresponding points and calculating a coordinate transformation coefficient between the images for each of the groups; and an image synthesizing step of generating a synthesis image using a plurality of the coordinate transformation coefficients and the second image.

The present invention can provide a technique used for an image processing apparatus aligning a plurality of images with one another, to perform accurate alignment all over the images.

Further features of the present invention will become apparent from the following description of exemplary embodiments with reference to the attached drawings.

DESCRIPTION OF THE EMBODIMENTS

First Embodiment

An imaging apparatus according to Embodiment 1 will now be described with reference to the drawings. The imaging apparatus according to Embodiment 1 has a function to photograph a plurality of images, and to measure, using these images, a distance to a subject included in the images. Same composing elements are denoted with a same reference symbol, and redundant description thereof is omitted.

<System Configuration>

Figure 1:
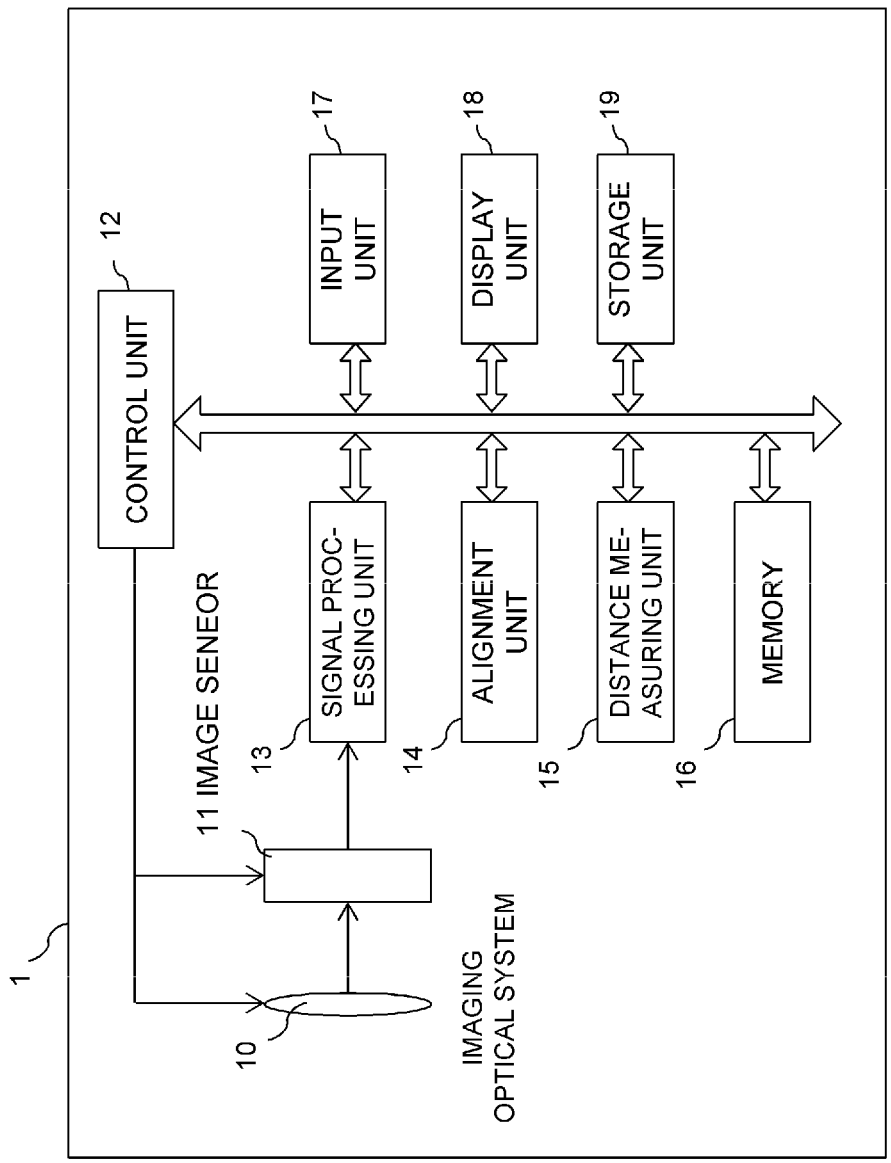
FIG. 1 is a block diagram showing a configuration of an imaging apparatus according to a first embodiment.

FIG. 1 is a diagram showing a system configuration of an imaging apparatus according to a first embodiment.

The imaging apparatus 1 has an imaging optical system 10, an image sensor 11, a control unit 12, a signal processing unit 13, an alignment unit 14, a distance measuring unit 15, a memory 16, an input unit 17, a display unit 18, and a storage unit 19.

The imaging optical system 10 is an optical system constituted by a plurality of lenses, and forms an image of incident light on an image plane of the image sensor 11. The imaging optical system 10 is a variable-focal optical system, and can perform automatic focusing by an auto focus function. The type of auto focus may be either active or passive.

The image sensor 11 is an image sensor that includes such an image sensor as a CCD or a CMOS. The image sensor 11 may be an image sensor that has a color filter or a monochrome image sensor. The image sensor 11 may also be a three-plate type image sensor.

The signal processing unit 13 processes signals outputted from the image sensor 11. In concrete terms, A/D conversion of an analog signal, noise removal, demosaicing, brightness signal conversion, aberration correction, white balance adjustment, color correction or the like is performed. Digital image data output by the signal processing unit 13 is temporarily accumulated in the memory 16 and then output to the display unit 18, the storage unit 19, the alignment unit 14, the distance measuring unit 15, and the like. Then, desired processing is executed on the digital image data.

The alignment unit 14 is means for aligning a plurality of consecutively taken images with one another. An alignment process will be described below in detail. The alignment unit 14 corresponds to corresponding point determining unit, transformation coefficient calculating unit, and image synthesizing unit. Alignment of images refers to association, with one another, of positions of a subject such as a person or an article in the images.

The distance measuring unit 15 is means for calculating a distance in a depth direction (subject distance) to a subject contained in an image. A distance measuring process will be described below in detail.

The input unit 17 is an interface for acquiring the input operation from the user, and is typically a dial, button, switch, touch panel or the like.

The display unit 18 is a display unit constituted by a liquid crystal display, an organic E1 display or the like. The display unit 18 is used for confirming composition for photographing, viewing photographed or recorded images, displaying various setting screens or displaying message information, for example.

The storage unit 19 is a nonvolatile storage medium that stores, for example, photographed image data, and parameters that are used for the imaging apparatus 1. For the storage unit 19, it is preferable to use a large capacity storage medium which allows high-speed reading and writing. A flash memory, for example, is suitable.

The control unit 12 controls each unit of the imaging apparatus 1. In concrete terms, the control unit 12 performs auto focusing using the auto focusing (AF), changes the focus position, changes the F number (diaphragm), loads and saves images, and controls the shutter and flash (not illustrated). The control unit 12 also measures the subject distance using an acquired image.

<Method for Measuring the Object Distance>

Now, a distance measuring operation performed by the imaging apparatus 1 will be described.

First, when a user starts taking an image by operating the input unit 17, auto focusing (AF) and automatic exposure control (AE) are performed, and an image is captured by the image sensor 11.

When the first image is taken, the second image is taken with an image taking parameter changed. The changed image taking parameter is at least one of the following: an F number, a focus position, and a focal distance. For the value of the parameter, a previously saved value may be read for use or a value may be determined based on information input by the user.

When the image taking parameter is changed, the second image is taken.

When a plurality of images is photographed, it is preferable to make the shutter speed faster and the photographing interval shorter to measure the distance more accurately, since the influence of the camera shaking or subject movement is decreased as the shutter speed is faster and the photographing interval is shorter. However if sensitivity is increased to make the shutter speed faster, in some cases the influence of noise is increased more so than the influence of the camera shaking, hence an appropriate shutter speed must be set considering sensitivity.

If two images are photographed, the photographed images are processed by the signal processing unit 13 respectively so as to be images suitable for alignment, and are temporarily stored in the memory 16. The image suitable for alignment is, for example, an RGB image obtained by demosaicing an image in a Bayer array format and then performing white balance correction on the image, or a brightness image resulting from a transformation of the RGB image into a color space such as YUV. In this case, at least one of the photographed images may be signal-processed for viewing and stored in the memory 16. The first loaded image is hereinafter referred to the first image, and the subsequently loaded image is hereinafter referred to as the second image. However, the first loaded image may be the second image, and the second loaded image may be the first image.

<<Alignment Process>>

Figure 2:
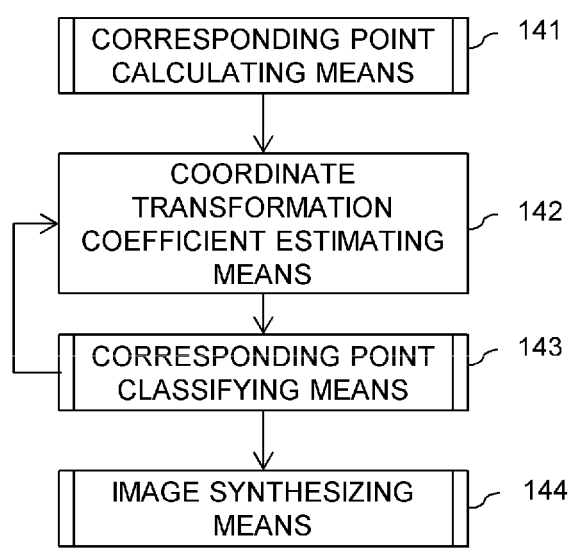
FIG. 2 is a diagram illustrating processing executed by an alignment unit according to the first embodiment.

Now, a process of aligning two taken images (aligning process) is executed. The aligning process will be described in brief with reference to FIG. 2. Means in blocks in FIG. 2 represent processes executed by the alignment unit 14.

First, the alignment process will be described in brief, and then the means shown in FIG. 2 will be described in detail.

First, two images (brightness images) accumulated in the memory 16 are input to corresponding point calculating means 141 for calculating corresponding points. The corresponding points are pairs of coordinates representing the corresponding positions in two images. For example, when an image contains a certain subject (scene), the corresponding point represents the coordinates of the subject in the other image.

Subsequently, coordinate transformation coefficient calculating means 142 determines on the basis of the specified corresponding point a coordinate transformation coefficient for correcting misalignment between two images. Determining the coordinate transformation coefficient allows alignment of the images based on parallel movement or the like.

However, the determination of only one coordinate transformation coefficient may fail to align an area in the image which moves distinctively in the image, if any.

Figure 3A:
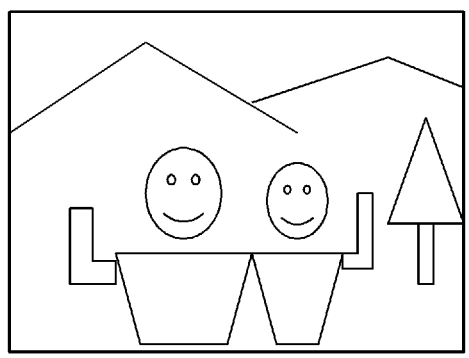
FIG. 3A and FIG. 3B are diagrams showing an example of an input image.
Figure 3B:
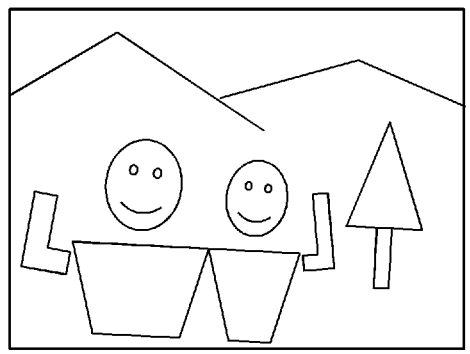

A case is considered where, for example, two images shown in FIG. 3A and FIG. 3B are aligned with each other.

The images contain a plurality of motions, that is, motions resulting from camera shake and motions resulting from movement of a subject (a person). Thus, simple parallel movement of the images may result in misaligned areas.

Thus, after the coordinate transformation coefficient is determined, corresponding point classifying means 143 extracts a corresponding point making a motion different from a motion indicated by the coordinate transformation coefficient and calculates a coordinate transformation coefficient again only for this corresponding point. This is repeated a plurality times to allow a plurality of coordinate transformation coefficients for each motion contained in the image. For example, in the example in FIG. 3A and FIG. 3B, coordinate transformation coefficients can be calculated for each detected motion, such as a coordinate transformation coefficient for a background, a coordinate transformation coefficient for the body of the person, and a coordinate transformation coefficient for the face of the person.

Finally, image synthesizing means 144 uses the calculated plurality of coordinate transformation coefficients to perform a coordinate transformation on each corresponding local area and synthesize the transformed image to generate an aligned image.

Now, the contents of processing executed by each means will be described in detail.

Figure 4:
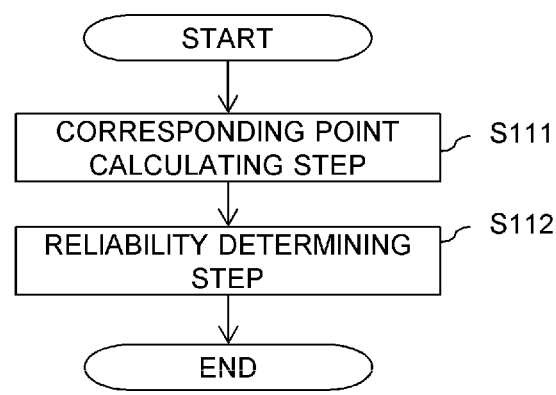
FIG. 4 is a processing flowchart of corresponding point calculating means according to the first embodiment.

FIG. 4 is a flowchart of processing executed by the corresponding point calculating means 141. The processing executed by the corresponding point calculating means 141 will be described with reference to FIG. 4.

Figure 5:
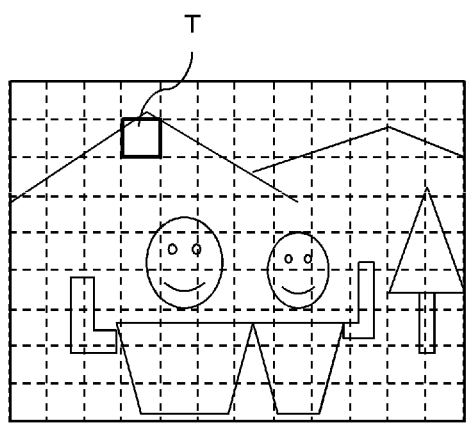
FIG. 5 is a diagram illustrating that an area is cut out from the image according to the first embodiment.

The corresponding point calculating means 141 first executes a corresponding point calculating step S111. The corresponding point calculating step S111 involves dividing a first image into blocks, cutting a predetermined area T out from the first image $I_1$, and searching a second image $I_2$ for the corresponding area using the area T as a template, for example, as shown in FIG. 5.

Specifically, an area that is the same as the area T in the first image in size is cut out from a position in the second image $I_2$ near coordinates corresponding to the area T. The absolute value sum of brightness differences between pixel values contained in the area is calculated. Then, calculation is performed with the cutout area sequentially displaced within a predetermined search area. A coordinate position with the smallest absolute value sum is stored as a corresponding point. The stored corresponding point is, for example, coordinates in the second image $I_2$ which correspond to central coordinates of the area T in the first image $I_1$. Thus, the corresponding point is determined for each block resulting from the division.

The magnitude of possible misalignment depends on a focal distance and an imaging interval during imaging. Thus, the search range may be appropriately set in accordance with the focal distance and the imaging interval.

Then, a reliability determining step S112 is executed. The reliability determining step S112 involves determining the reliability of the detected corresponding point. If misalignment occurs even outside the search range, the corresponding point fails to be determined. Thus, even when a point where the absolute value sum is minimized is determined it is not appropriate to set this point to be a corresponding point. Thus, a threshold is provided for the absolute value sum, and only when the absolute value sum of detected brightness differences is equal to or smaller than the threshold, the point is stored as a reliable corresponding point. When the absolute value sum is larger than the threshold, the corresponding information is discarded instead of being stored.

The processing in FIG. 4 is executed on all the blocks resulting from the division. That is, the cutout area T is sequentially moved in the first image $I_1$, and the corresponding point calculating step S111 and the reliability determining step S112 are repeated to determine a corresponding point for each block. In the first embodiment, the example has been described where the entire image is divided into blocks. However, in view of the search range, blocks may be omitted from a peripheral portion of the image.

Furthermore, in determining a corresponding point, square sum or correlation may be used besides the absolute value sum of the brightness difference. Additionally, in the first embodiment, the example has been illustrated where brightness images are used. However, images other than the brightness images may be used. For example, color planes of RGB images or color difference images may be used.

With reference back to FIG. 2, processing executed by the coordinate transformation coefficient calculating means 142 will be described.

To allow the first image $I_1$ and the second image $I_2$ to be aligned with each other, a coordinate transformation may be performed on the second image $I_2$. The coordinate transformation coefficient calculating means 142 calculates a transformation coefficient for the coordinate transformation based on a plurality of determined corresponding points.

When a point (x, y) on the first image $I_1$ is assumed to correspond to a point (x', y') on the second image $I_2$, a coordinate transformation coefficient for correcting the misalignment can be expressed by Formula 1. Formula 1 expresses a projective transformation.

[Math. 1]

$$\begin{pmatrix} x \\ y \\ 1 \end{pmatrix} \approx \begin{pmatrix} c_{11} & c_{12} & c_{13} \\ c_{21} & c_{22} & c_{23} \\ c_{31} & c_{32} & c_{33} \end{pmatrix} \begin{pmatrix} x' \\ y' \\ 1 \end{pmatrix}$$ Formula 1

Formula 1 includes nine coordinate transformation coefficients c. However, the result remains the same even with constant multiplication, and thus, the degree of freedom is eight. Consequently, eight equations can be created with at least four pairs of corresponding points. The coordinate transformation coefficients c can be calculated by solving simultaneous equations. Furthermore, if a large number of corresponding points are present, the coordinate transformation coefficients c can be calculated using the method of least squares. In the description below, the coordinate transformation coefficients are assumed to be a set of a plurality of coefficients as described above.

Figure 6:
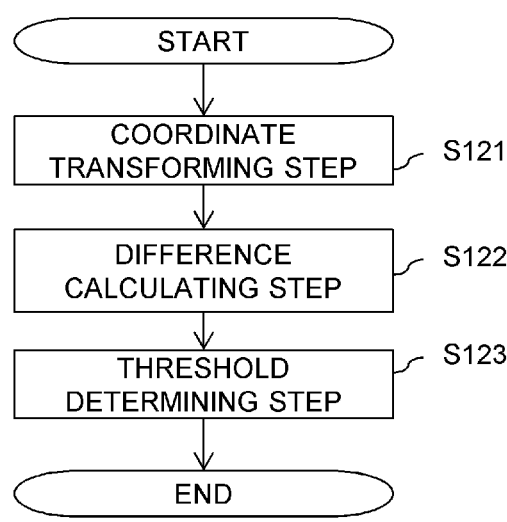
FIG. 6 is a processing flowchart of corresponding point classifying means according to the first embodiment.

FIG. 6 is a flowchart of processing executed by the corresponding point classifying means 143. The processing executed by the corresponding point classifying means 143 will be described with reference to FIG. 6.

First, in a coordinate transforming step S121, the calculated coordinate transformation coefficients c and Formula 1 are used to transform the second image $I_2$ into a coordinate transformation image I'.

Then, at a difference calculating step S122, the distance between the coordinates of the corresponding point in the coordinate transformation image I' and the coordinates of the corresponding point in the first image $I_1$ (hereinafter referred to as the inter-coordinate distance) is determined. The inter-coordinate distance is preferably determined using a Euclidean distance. However, in view of computational costs, a Manhattan distance may be used. In this case, corresponding points to be processed are all the corresponding points in the image.

Subsequently, a threshold determining step S123 determines whether the images contain corresponding points for which the calculated inter-coordinate distance is larger than the threshold. When the images contain corresponding points for which inter-coordinate distance is larger than the threshold, the images are estimated to contain a local area making a motion different from an estimated motion. Hence, the corresponding points are stored as points that fail to be aligned using the calculated coordinate transformation coefficients (hereafter referred to as misaligned corresponding points). Corresponding points for which the inter-coordinate distance is smaller than the threshold are corresponding points compatible with the calculated coordinate transformation coefficients.

Then, the corresponding points are grouped based on the results of the determination. In this case, a group to which the corresponding points compatible with the calculated coordinate transformation coefficients is referred to as a first group.

The processing will further be described with reference back to FIG. 2.

Now, to allow coordinate transformation coefficients to be determined again based on the results of the grouping, the processing is returned to the coordinate transformation coefficient calculating means 142.

The coordinate transformation coefficient calculating means 142 first calculates coordinate transformation coefficients again using only the group of corresponding points belonging to the first group. Since the misaligned corresponding points have been excluded from the first group, the coordinate transformation coefficients can be more accurately calculated. Then, the calculated coordinate transformation coefficients and the group of corresponding points are stored. The estimated coordinate transformation coefficients are coordinate transformation coefficients corresponding to most frequented motions in the image. For example, when the taken image shows a still subject, the coordinate transformation coefficients represent motions resulting from camera shake.

Then, coordinate transformation coefficients are calculated utilizing only a group of corresponding points not belonging to any established group. In this case, calculated coordinate transformation coefficients represent second most frequented motions in the image. Then, the calculated coordinate transformation coefficients and the group of corresponding points are transmitted to the corresponding point classifying means 143.

The corresponding point classifying means 143 further executes the coordinate transforming step S121, the difference calculating step S122, and the threshold determining step S123 as described above on a group of corresponding points not belonging to any established group. The same processing is subsequently repeated to establish a second group, a third group, and so on according to the decreasing order of most frequented motions in the image. The coordinate transformation coefficients are determined for each group.

Figure 7A:
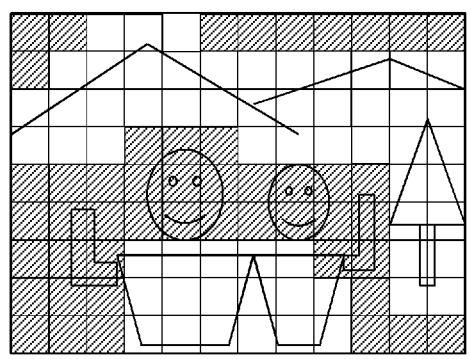
FIGS. 7A to 7C are diagrams illustrating the results of classification of corresponding points according to the first embodiment.
Figure 7B:
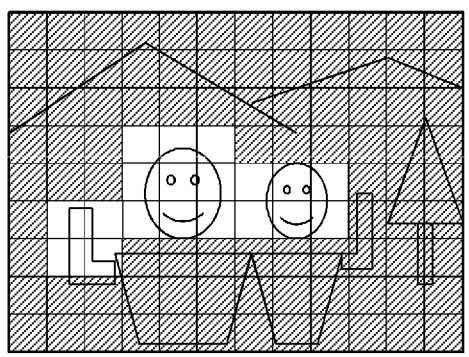
Figure 7C:
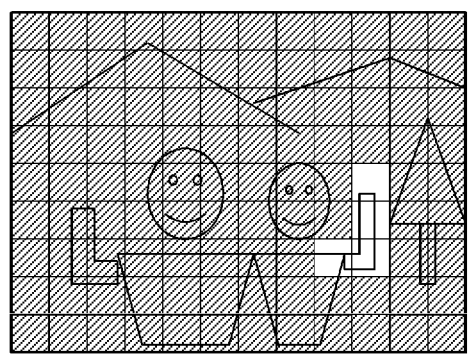

FIGS. 7A to 7C show a specific example. White blank portions in FIG. 7A are blocks determined during the first loop to be correct corresponding points and classified into the first group. That is, the blocks correspond to motions most frequently appearing in the image (camera shake). Furthermore, hatched portions in FIG. 7A are blocks determined during the first loop to be misaligned corresponding points.

White blank portions in FIG. 7B are blocks determined during the second loop to be correct corresponding points and classified into the second group. The blocks correspond to motions second most frequently appearing in the image.

Similarly, white blank portions in FIG. 7C are blocks determined during the third loop to be correct corresponding points and classified into the third group. The blocks correspond to motions third most frequently appearing in the image.

As described above, the alignment unit 14 repeats a process for extracting misaligned corresponding points by setting areas with corresponding points not belonging to any established group to be processing target areas. This allows the corresponding points to be grouped based on the motion of the subject.

A loop of processing between the coordinate transformation coefficient calculating means 142 and the corresponding point classifying means 143 is repeated until the number of misaligned corresponding points becomes equal to or smaller than a predetermined value. The predetermined value may be any value as long as the coordinate transformation coefficients can be calculated.

The use of a projective transformation in Formula 1 involves the need of four pairs of corresponding points for a coordinate transformation. However, the use of an affine transformation as shown in Formula 2 involves the need of only three pairs of corresponding points.

[Math. 2]

$$\begin{pmatrix} x \\ y \\ 1 \end{pmatrix} \approx \begin{pmatrix} c_{11} & c_{12} & c_{13} \\ c_{21} & c_{22} & c_{23} \\ 0 & 0 & 1 \end{pmatrix} \begin{pmatrix} x' \\ y' \\ 1 \end{pmatrix} \qquad \text{Formula 2}$$

The presence, in the image, of many objects moving distinctively or many corresponding points leads to an increased number of repetitions needed until convergence and thus leads to an extended processing time. In such a case, a predetermined number of loops may be repeated. When the loops end, a number of coordinate transformation coefficients corresponding to the number of repetitions are acquired.

Now, processing executed by the image synthesizing means 144 will be described.

The image synthesizing means 144 transforms the second image using the plurality of calculated coordinate transformation coefficients, and couples together local areas in the plurality of images which match the first image better to generate an aligned synthesis image. This processing is hereinafter referred to as an image synthesizing process.

Figure 8:
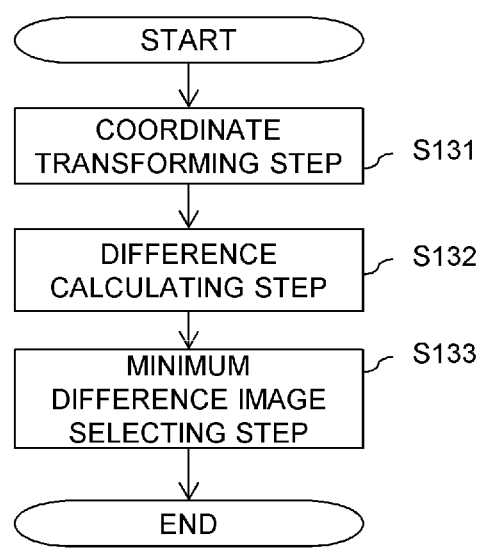
FIG. 8 is a processing flowchart of image synthesis means according to the first embodiment.

FIG. 8 is a flowchart showing the flow of the image synthesizing process in detail.

First, in a coordinate transforming step S131, the coordinate transformation coefficients calculated during the first loop are used to perform a coordinate transformation on the second image $I_2$ to generate an image $I_{2'}$. Thus, an image is generated in which misalignment between the first image $I_1$ and the second image $I_2$ caused by movement of the camera has been substantially corrected.

Subsequently, the coordinate transformation coefficients calculated during the second loop are used to perform a coordinate transformation on the second image $I_2$ to generate an image $I_{2''}$. The image $I_{2'}$ and the image $I_{2''}$ are transformed images according to the present invention.

Then, in a difference calculating step S132, the first image $I_1$ is divided into blocks. In this case, the first image $I_1$ is divided into blocks each of the same size as that of each of the blocks used to calculate the corresponding points. The blocks resulting from the division are referred to as local areas T. The size of the block may be smaller than the size of each of the blocks used to calculate the corresponding points. This allows alignment to be more accurately achieved.

Then, an area corresponding to each of the local areas T is extracted from the transformed images $I_{2'}$ and $I_{2'''}$ to obtain local areas $T_{2'}$ and $T_{2'''}$. Subsequently, the difference in brightness value between the local area T and the local area $T_{2'}$ and the difference in brightness value between the local area T and the local area $T_{2'''}$ are determined to obtain difference values $S_{2'}$ and $S_{2'''}$.

Then, in a maximum difference image selecting step S133, the absolute value sum of the difference values $S_{2'}$ and $S_{2'''}$ is determined. The local area determined to have a smaller absolute value sum is changed with a corresponding area in the transformed image $I_{2'}$. This is because the smaller absolute value sum means higher similarity to the first image.

In this case, the difference is calculated and the minimum difference image is selected, for each block. However, first, a difference image may be generated, and then, the minimum difference image may be selected for each block.

The processing returns to the difference calculating step S132, where similar processing is repeated with the selected local area changed. In this case, the local areas are the blocks resulting from the division. However, the size of the local area may be determined, and similar processing may be executed with the local area displaced on a pixel-by-pixel basis to select the minimum difference image for all pixels.

Finally, the transformed image $I_{2'}$ is formed as an image coupling the more similar to the corresponding area of the first image $I_1$ from among the corresponding local area images in the transformed images $I_{2'}$ and $I_{2'''}$. That is, the transformed image $I_{2'}$ as a whole is more similar to the first image $I_1$.

Then, the processing returns to the coordinate transforming step S131 to perform a coordinate transformation on the second image $I_2$ using the coordinate transformation coefficients calculated during the third loop, thus generating a transformed image $I_{2'''}$. Subsequently, the difference calculating step S122 and the minimum difference image selecting step S133 are executed to generate an image $I_{2'}$ more similar to the first image $I_1$.

The image synthesizing means 144 repeatedly executes the above-described processing (S132 and S133) so that the number of repetitions of the processing is equal to the number of the coordinate transformation coefficients calculated by the coordinate transformation coefficient calculating means 142. When all of the processing ends, the generated image $I_{2'}$ is saved in the memory 16.

If there is sufficient available memory, first, coordinate transformations may be performed so that the number of the coordinate transformations is equal to the number of the coordinate transformation coefficients, thus generating a plurality of transformed images. Then, a local area may be selected in which the difference in brightness between the first image and the second image is minimized.

The image processing apparatus according to the first embodiment executes such processing as described above to enable alignment to be performed on all the areas in the image even when the different areas are exhibiting different motions.

<<Distance Measuring Process>>

Now, a method will be described which involves measuring the distance to a subject using a first image and a synthesis image which have been aligned with each other. The two images aligned with each other are images taken with a focus position changed.

The distance measuring unit 15 acquires two images for distance measurement from the memory 16 to calculate a distance map based on the input two images. The distance map is data representing the distribution of subject distances in the image. The calculated distribution of subject distances is displayed through the display unit 18 and is saved to the storage unit 19.

Figure 9:
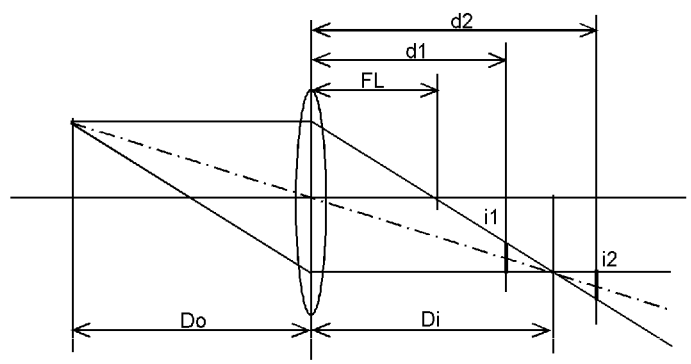
FIG. 9 is a diagram illustrating the principle of a DFD method.

The subject distance can be measured using a well-known depth from defocus (DFD) method. Now, the principle of distance calculation based on the DFD method will be described using FIG. 9.

A distance $D_o$ to a distance measurement target O can be determined using Formula 3 based on a lens formula if a position Di, where an image of the target O is formed on the object image side, can be figured out. The focal distance is denoted by FL.

[Math. 3]

$$\frac{1}{D_o} + \frac{1}{D_i} = \frac{1}{FL} \qquad \text{Formula 3}$$

However, the distance can be determined using Formula 3, only for an object with an image thereof formed on an imaging plane. The DFD method allows the distance to an object with an image thereof not formed on the imaging plane to be measured as follows. The image forming position of object is determined based on the size of blurring (a circle of confusion) of the object projected on the imaging plane. The image forming position is then substituted into Formula 3. The image forming position is determined utilizing the proportion of the circle of confusion to the imaging plane and the image forming position.

Now, a case is considered where an object at distance $D_1$ is projected at an imaging plane position $d_1$. At this time, an image $i_1$ is blurred and spread. When, in this case, a point spread function is denoted by $PSF_1$ and a scene is denoted s, the image $i_1$ can be expressed using a convolution of the point spread function $PSF_1$ and the scene S.

[Math. 4]

$$i_1 = PSF_1 \otimes s \qquad \text{Formula 4}$$

Now, a circle of confusion can be calculated by modeling the PSF using the circle of confusion as a parameter so that the PSF can be estimated based on the image $i_1$. Moreover, the image forming position can be determined based on the circle of confusion. The distance can then be calculated using Formula 3.

However, in Formula 4, the scene s is unknown, and the correct determination of the circle of confusion is impossible if any appropriate measure is taken. Thus, an image is taken at a different imaging plane position $d_2$. The resultant image is denoted by $i_2$.

When a Fourier transformation of the scene s is denoted by S, an optical transfer function resulting from a Fourier transformation of the $PSF_1$ of the first taken image is denoted by $OTF_1$, the OTF of the second taken image is denoted by $OTF_2$, and taken images are denoted by $OTF_1 \times S$ and $OTF_2 \times S$. The ratio between the two images is as shown in Formula 5, and $OTF_r$ that is the ratio for the OTFs which is independent of the scene is calculated. Then, based on the geometric relations between Formula 3 and FIG. 9, the circle of confusion of the object O can be calculated, allowing the distance to be calculated.

[Math. 5]

$$\frac{F\{i_2\}}{F\{i_1\}} = \frac{F\{PSF_2 \otimes s\}}{F\{PSF_1 \otimes s\}} = \frac{OTF_2 \cdot S}{OTF_1 \cdot S} = \frac{OTF_2}{OTF_1} = OTF_r \qquad \text{Formula 5}$$

The first embodiment enables correction of misalignment resulting from shake of the imaging apparatus and misalignment resulting from movement of the moving object. Moreover, even when the taken image contains a plurality of moving objects, misalignment can be corrected for each of the moving objects. This also enables the distance to be accurately measured throughout the image.

Furthermore, misalignment can be corrected not only for parallel movement but also for deformation such as enlargement and contraction, rotation, and shear. This allows misalignment to be more accurately corrected.

In the first embodiment, an example of the DFD method is utilized to measure the subject distance. However, another DFD method or a depth from focus (DFF) method may be applied. Any method may be used as long as the method allows the subject distance to be determined using two images aligned with each other.

Second Embodiment

A second embodiment is an embodiment in which, during an alignment process, corresponding points are grouped by detecting a face in an image. Furthermore, in the second embodiment, instead of distance measurement, a high dynamic range (HDR) process is executed using the results of the alignment.

Figure 10:
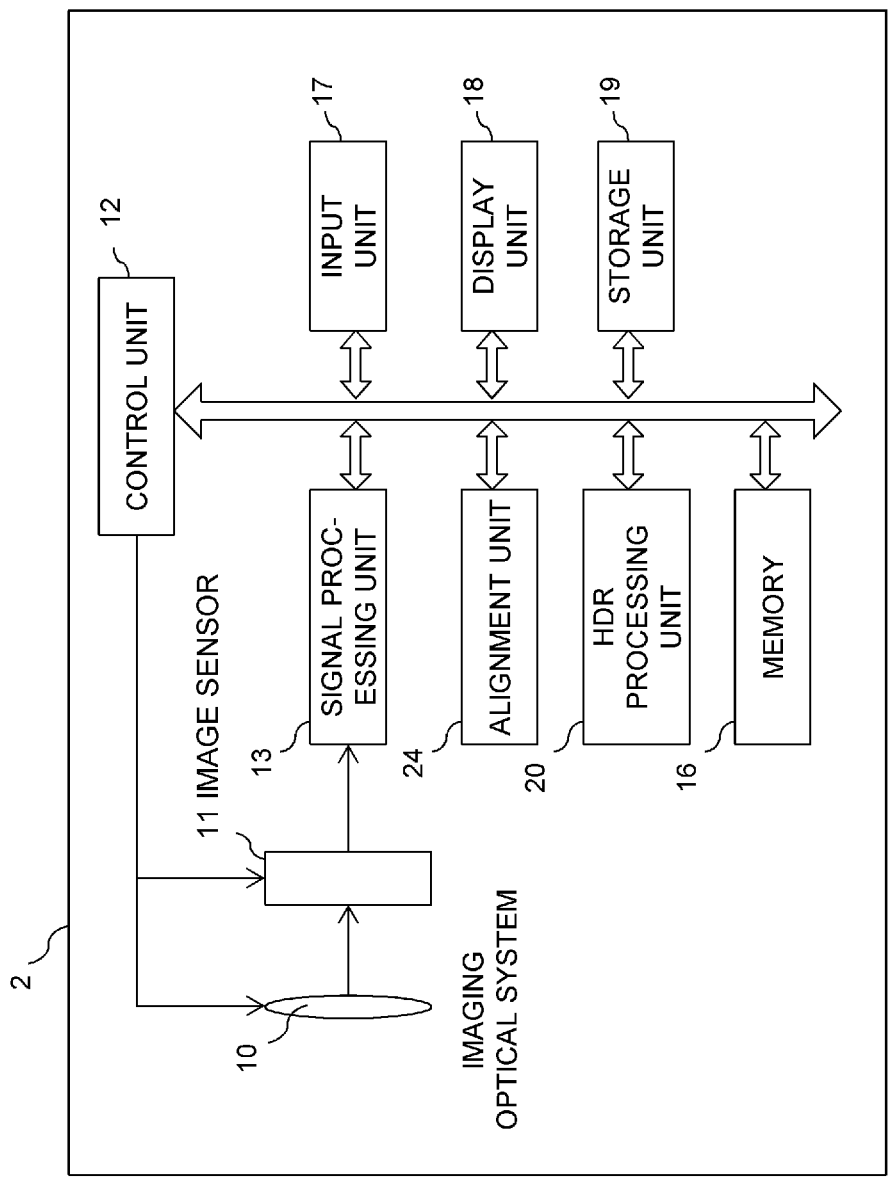
FIG. 10 is a block diagram showing a configuration of an imaging apparatus according to a second embodiment.

FIG. 10 is a diagram of a system configuration of an imaging apparatus according to the second embodiment. The imaging apparatus according to the second embodiment is different from the imaging apparatus according to the first embodiment in terms of processing implemented by the alignment unit and in that the imaging apparatus according to the second embodiment has an HDR processing unit 20 instead of a distance measuring unit 15.

The HDR processing unit 20 is means for generating an HDR image by using a plurality of images with different exposures as an input to add the images together with a mixture ratio changed in accordance with the exposure levels. A process for generating an HDR image is well known and will not be described. The generated HDR image is displayed through a display unit 18 and saved to a storage unit 19.

The remaining part of the configuration is similar to the corresponding part of the configuration according to the first embodiment and will thus not be described below in detail.

In the second embodiment, two images are taken as in the case of the first embodiment, but instead of the focus position, the exposure is changed during the image taking. The two taken images are input to an alignment unit 24, which then aligns the images with each other.

Figure 11:
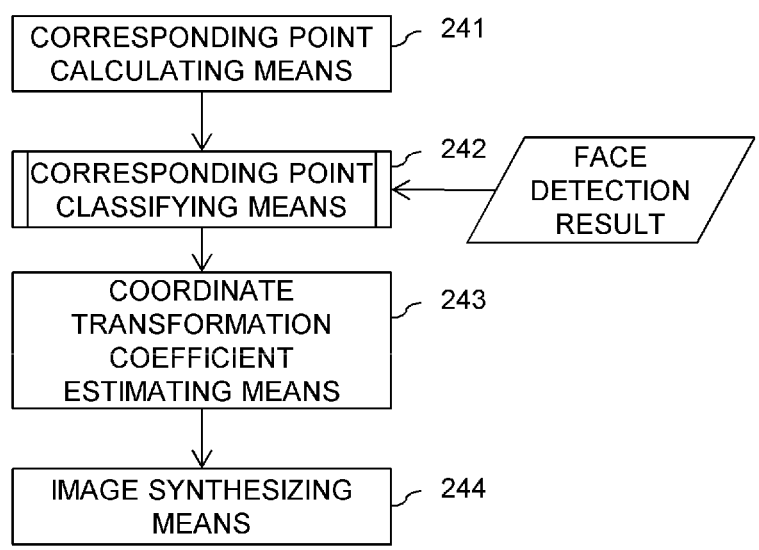
FIG. 11 is a diagram illustrating processing executed by an alignment unit according to a second embodiment.

The alignment unit 24 processes a plurality of images including an image serving as a reference (hereinafter referred to as a reference image), and outputs the plurality of images aligned with the reference image (hereinafter referred to as the synthesis images). The alignment process according to the second embodiment will be described in brief with reference to FIG. 11. Means in blocks in FIG. 11 represent processes executed by the alignment unit 24.

First, two images accumulated in the memory 16 are input to corresponding point calculating means 241. In this case, a reference image and other images are input.

Then, corresponding point classifying means 242 classifies corresponding points. The corresponding points are classified depending on whether or not a face is present in the image.

Figure 12:
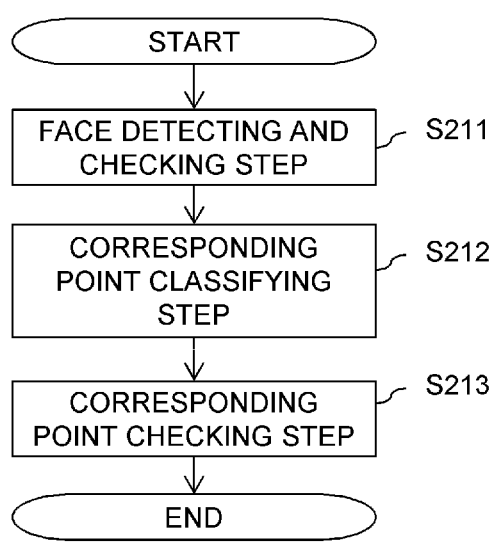
FIG. 12 is a processing flowchart of corresponding point calculating means according to the second embodiment.

The processing executed by the corresponding point classifying means 242 will be described in detail with reference to FIG. 12. First, a face detecting and checking step S211 determines whether or not a human face is present in the image. When no face is detected in the image, the processing is ended. In this case, the processing may then shift to such a corresponding point classifying process as executed in the first embodiment.

When faces are detected in the image, in a corresponding point classifying step 212, for each of the areas (face areas) corresponding to the detected faces, corresponding points present in the area are grouped. A group is also generated for the area where no face is present. Thus, the number of the generated groups is equal to the number of the detected faces plus one.

A corresponding point number checking step 213 determines whether the number of corresponding points in each group is equal to or larger than a value needed for calculation of coordinate transformation coefficients. When the number is smaller than the value, the corresponding points belonging to the group are excluded. For simplification of the calculations, a threshold for the size of the face area may be preset so that, when a face area with a size equal to or smaller than the threshold is detected, no group is generated for the face area.

The processing will further be described with reference back to FIG. 11.

Coordinate transformation coefficient calculating means 243 calculates coordinate transformation coefficients for each generated group. Image synthesizing means 244 executes processing similar to the corresponding processing according to the first embodiment to generate an aligned synthesis image. The generated synthesis image is saved to the memory 16, and the HDR processing unit 20 executes an HDR process on the synthesis image.

When an image of a stationary person is taken, the synthesis of images based on the HDR process may fail to achieve alignment of the face area, resulting in a blurred synthesis image, because the head of the person is more likely to move than the torso of the person. In contrast, the second embodiment enables accurate alignment even if persons' faces are moving differently, allowing less blurred synthesis images to be generated.

In the second embodiment, the coordinate transformation coefficients are calculated on the assumption that the areas other than the face area are making the same motion. However, the areas other than the face area may be grouped using a method similar to the corresponding method according to the first embodiment.

Furthermore, in the second embodiment, the corresponding points are grouped by detecting a person's face. However, in use of a process of detecting a person per se, the areas may be grouped depending on whether the area contains a person or an object other than the person. Additionally, when a person is detected, the areas may be grouped depending on whether the area contains a person's face or a part of the person's body other than the face. Moreover, when the image contains subjects other than persons, the objects contained in the image may be recognized so that the grouping is performed for each of the recognized objects.

Alternatively, areas likely to gather attention from people may be extracted and grouped. For example, when areas with characters or lines for which image misalignment is easily visually perceived are extracted and formed into a group, an uncomfortable feeling can be reduced which a viewer may have when viewing a synthesized image.

Furthermore, when three or more images are input, a plurality of synthesis images may be generated by repeating the above-described processing.

Third Embodiment

A third embodiment is an embodiment in which motion vectors are calculated based on corresponding points so that the corresponding points are grouped using information on adjacent motion vectors.

A configuration of an imaging apparatus 1 according to the third embodiment is similar to the configuration of the imaging apparatus according to the second embodiment.

A difference in processing between the third embodiment and the second embodiment will be described below.

A flow of processing executed by an alignment unit 24 according to the third embodiment is similar to the flow according to the second embodiment (FIG. 11) except that, in the third embodiment, corresponding point classifying means 242 groups corresponding points using motion vectors instead of the results of face detection.

The corresponding point classifying means 242 according to the third embodiment calculates, based on calculated corresponding points, motion vectors representing misalignment between corresponding points in two images. The corresponding point classifying means 242 then compares each of the motion vectors with the motion vector of the adjacent corresponding point. Based on the result of the comparison, the corresponding point classifying means 242 determines that the two motion vectors are similar when the differences in magnitude and direction between the motion vectors are equal to or smaller than corresponding thresholds, and incorporates the motion vectors into the same group. When the differences are larger than the thresholds, the motion vectors are determined to be dissimilar and are not incorporated into the group.

This processing is executed on all the motion vectors to allow a plurality of similar motion vectors to be grouped.

However, this method checks only the adjacent motion vectors and may thus result in inclusion, in the same group, of motion vectors that are dissimilar in magnitude and direction. Thus, after groups are generated, histograms are generated for each group so that the group can be divided as necessary.

Specifically, for a group of motion vectors included in the same group, histograms are calculated which are indicative of frequency distributions for the magnitude and the direction. When the resultant histograms are unimodal, the group is determined to include only similar motion vectors. On the other hand, when at least either the histogram for the magnitude or the histogram for the direction is multimodal, the group is determined to have a mixture of different motions. In this case, the group is divided so that the histogram includes a single peak. Thus, the generation of histograms allows checking of whether all the motion vectors included in the group are both locally and globally similar.

Processing executed after the grouping of the corresponding points is similar to the corresponding processing according to the second embodiment.

According to the third embodiment, the corresponding points can be grouped simply by comparing the motion vectors with each other. This eliminates the need to execute a repetitive process or a face detecting process, enabling a reduction in the amount of computation.

(Variations)

The description of the embodiments is illustrative of the description of the present invention. The present invention may be implemented by appropriately varying or combining the embodiments without departing from the spirits of the invention. For example, the preset invention may be implemented as an imaging apparatus including at least a part of the above-described processing or an image processing apparatus with no image pickup means. Alternatively, the present invention may be implemented as an image processing method or as an image processing program allowing the image processing apparatus to carry out the image processing method. The above-described processing and means may be freely combined together for implementation as long as the combination avoids leading to technical inconsistency.

Furthermore, the element techniques described in the embodiments may be optionally combined together.

For example, the following may be freely combined together for implementation: the bracketing method, the method for grouping corresponding points, the use of the distance measuring process, and the use of the HDR process.

Furthermore, in the description of the embodiments, the image is divided into blocks and the corresponding points are determined for each block. However, the corresponding points need not necessarily be assigned to the blocks. For example, feature points may be extracted from the image so that the corresponding points can be assigned to the feature points. This allows moving objects of smaller sizes to be dealt with compared to the division into blocks.

The above mentioned measuring technique of the present invention can be suitably applied to an imaging apparatus, such as a digital camera or a digital camcorder, or an image processor and a computer that performs an image process on image data acquired by the imaging apparatus. The present invention can also be applied to various electronic appliances enclosing the imaging apparatus or the image processor (e.g. including portable phones, smartphones, slate type devices and personal computers).

In the embodiments, the configuration of incorporating the distance measuring function into the imaging apparatus main unit was described, but the distance may be measured by an apparatus other than the imaging apparatus. For example, a distance measuring function may be incorporated into a computer that includes an imaging apparatus, so that the computer acquires an image photographed by the imaging apparatus, and calculates the distance. A distance measuring function may be incorporated into a computer that can access a network via cable or radio, so that the computer acquires a plurality of images via the network, and measures the distance.

The acquired distance information can be used for various image processes, such as area division of an image, generation of a three-dimensional image or image depth, and emulation of a blur effect.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-167531, filed on Aug. 12, 2013, which is hereby incorporated by reference herein in its entirety.

What is claimed is:

1. An image processing apparatus comprising:
   a search unit configured to search a plurality of corresponding points in a second image that correspond to a plurality of points in a first image respectively;
   a calculating unit configured to generate groups, each including a part of the plurality of corresponding points based on a distance between each of the plurality of points in the first image and the respective corresponding points in the second image, and to calculate a coordinate transformation coefficient corresponding to each generated group, wherein the calculating unit:
      generates a first group including a first part of the plurality of corresponding points in the first image and a second group including a second part of the plurality of corresponding points in the first image and not included in the first group, and
      calculates a first coordinate transformation coefficient corresponding to the first group and a second coordinate transformation coefficient corresponding to the second group; and
   a synthesizing unit configured to generate a synthesis image, using at least one generated coordinate transformation coefficient and the second image.

2. The image processing apparatus according to claim 1, wherein the calculating unit:
   generates n (n being a natural number of 3 or more) groups; and
   calculates a $n^{th}$ coordinate transformation coefficient corresponding to the $n^{th}$ group;
   wherein the $n^{th}$ group contains a part of the plurality of corresponding points contained in the first image but not contained in a $m^{th}$ (m being a natural number of n−1 or less) group.

3. The image processing apparatus according to claim 2, wherein the calculating unit is configured to end the calculation of a coordinate transformation coefficient in the case where a number of corresponding points belonging to the generated $n^{th}$ group is smaller than a predetermined number.

4. The image processing apparatus according to claim 2, wherein the calculating unit is configured to calculate the $n^{th}$ coordinate transformation coefficients using only the corresponding points included in the $n^{th}$ group.

5. The image processing apparatus according to claim 1, wherein the calculating unit is configured to detect a face and to perform grouping in such a manner that corresponding points belonging to the detected face belong to a same group.

6. The image processing apparatus according to claim 1, wherein the calculating unit is configured to acquire a motion vector at a first corresponding point, and to generate the group in such a manner that, when a direction of the motion vector of the first corresponding point is similar to a direction of a motion vector of the second corresponding point adjacent to the first corresponding point, the first corresponding point and the second corresponding point belong to an identical group.

7. The image processing apparatus according to claim 6, wherein the calculating unit is configured to generate a histogram representing at least one of a magnitude or a direction of a motion vector included in the group, and configured to divide the group so as to make the histogram unimodal when the histogram is multimodal.

8. The image processing apparatus according to claim 1, wherein the synthesizing unit is configured to:
   generate a plurality of transformed images from the second image using each of a plurality of coordinate transformation coefficients;
   compare a local area included in the first image and corresponding local areas included in the plurality of transformed images, the local areas being at corresponding coordinates respectively;
   select a local area from the plurality of corresponding local areas based on the comparison result, for each local area of the first image; and
   generate the synthesis image by coupling together selected local areas.

9. The image processing apparatus according to claim 8, wherein, in the comparing, the synthesizing unit is configured to determine a similarity between the local areas based on an absolute value sum or a square sum of the differences.

10. The image processing apparatus according to claim 8, wherein, in the comparing, the synthesizing unit is configured to determine a similarity between the local areas based on a correlation between pixel values in the local areas.

11. A distance measuring apparatus calculating a subject distance in a plurality of images differently blurred, the distance measuring apparatus comprising the image processing apparatus according to claim 1 and configured to measure a subject distance using the first image and the synthesis image.

12. An imaging apparatus comprising:
   an imaging optical system;
   an image sensor; and
   the distance measuring apparatus according to claim 11,
   wherein the distance measuring apparatus measures a subject distance using a plurality of images obtained by the imaging optical system and the image sensor.

13. An image processing method comprising:
   a searching step of searching a plurality of corresponding points contained in a second image that correspond to a plurality of points in a first image respectively;
   a calculating step of generating groups, each including a part of the plurality of corresponding points based on a distance between each of a the plurality of points contained in the first image and the respective corresponding points in the second image and calculating a coordinate transformation coefficient corresponding to each generated group, wherein the calculating step:
      generates a first group including a first part of the plurality of corresponding points in the first image and a second group including a second part of the plurality of corresponding points in the first image and not included in the first group, and calculates a first coordinate transformation coefficient corresponding to the first group and a second coordinate transformation coefficient corresponding to the second group; and a synthesizing step of generating a synthesis image using at least one generated coordinate transformation coefficient and the second image.

14. The image processing method according to claim 13, wherein the calculating step comprises:
   a step of generating n (n being a natural number of 3 or more) groups; and
   a step of calculating a $n^{th}$ coordinate transformation coefficient corresponding to the $n^{th}$ group, wherein the $n^{th}$ group contains a part of the plurality of corresponding points contained in the first image but not contained in a $m^{th}$ (m being a natural number of n−1 or less) group.

15. The image processing method according to claim 14, wherein, in the calculating step, the calculation of the coordinate transformation coefficient is ended in the case where a number of corresponding points belonging to the group generated $n^{th}$ group is smaller than a predetermined number.

16. The image processing method according to claim 14, wherein, in the calculating step, the $n^{th}$ coordinate transformation coefficient is calculated using only the corresponding points included in the $n^{th}$ group.

17. The image processing method according to claim 13, wherein, in the calculating step, a face is detected, and grouping is performed in such a manner that corresponding points belonging to the detected face belong to a same group.

18. The image processing method according to claim 13, wherein the calculating step comprises:
   a step of acquiring a motion vector at a first corresponding point; and
   a step of generating the group in such a manner that, when a direction of the motion vector of the first corresponding point is similar to a direction of a motion vector of the second corresponding point adjacent to the first corresponding point, wherein the first corresponding point and the second corresponding point belong to an identical group.

19. The image processing method according to claim 13, wherein the synthesizing step comprises:
   a step of generating a plurality of transformed images from the second image by using each of the plurality of coordinate transformation coefficients;
   a step of comparing a local area included in the first image and corresponding local areas included in the plurality of transformed images, the local areas being in the corresponding coordinates respectively;
   a step of selecting a local area from the plurality of corresponding local areas based on the comparison result, for each local area of the first image; and
   a step of generating the synthesis image by coupling together selected local areas.

20. A non-transitory computer storage medium recording a computer program for causing a computer to perform an image processing method comprising:
   a searching step of searching a plurality of corresponding points contained in a second image that correspond to a plurality of points in a first image respectively;
   a calculating step of generating groups, each including a part of the plurality of corresponding points based on a distance between each of the plurality of points contained in the first image and the respective corresponding points in the second image and calculating a coordinate transformation coefficient corresponding to each generated group, wherein the calculating step
      generates a first group including a first part of the plurality of corresponding points in the first image and a second group including a second part of the plurality of corresponding points in the first image and not included in the first group, and
      calculates a first coordinate transformation coefficient corresponding to the first group and a second coordinate transformation coefficient corresponding to the second group; and
   a synthesizing step of generating a synthesis image using at least one generated coordinate transformation coefficient and the second image.

* * * * *